United States Patent
Yoshida et al.

(10) Patent No.: US 6,755,217 B1
(45) Date of Patent: Jun. 29, 2004

(54) CORRUGATED RESIN TUBE

(75) Inventors: Naoki Yoshida, Yokohama (JP); Tetsuo Masatake, Yokohama (JP); Hirozou Uejou, Yokohama (JP)

(73) Assignee: Piolax Inc., Kanagawa (JP)

( * ) Notice: Subject to any disclaimer, the term of this patent is extended or adjusted under 35 U.S.C. 154(b) by 0 days.

(21) Appl. No.: 09/869,470

(22) PCT Filed: Oct. 30, 2000

(86) PCT No.: PCT/JP00/07633

§ 371 (c)(1),
(2), (4) Date: Jun. 28, 2001

(87) PCT Pub. No.: WO01/31245

PCT Pub. Date: May 3, 2001

(30) Foreign Application Priority Data

Oct. 29, 1999 (JP) .......................... 11/309261

(51) Int. Cl.$^7$ ............................... F16L 11/00
(52) U.S. Cl. .................. 138/121; 138/125; 138/137; 138/153
(58) Field of Search ................ 138/121, 122, 138/125, 137, 153

(56) References Cited

U.S. PATENT DOCUMENTS

| | | | | |
|---|---|---|---|---|
| 3,988,188 A | * | 10/1976 | Johansen et al. ........... | 138/125 |
| 4,091,063 A | * | 5/1978 | Logan ........................ | 138/122 |
| 4,165,765 A | | 8/1979 | Gilbu et al. | |
| 5,062,457 A | * | 11/1991 | Timmons ................... | 138/122 |
| 5,148,837 A | * | 9/1992 | Argen et al. ................ | 138/122 |
| 5,305,799 A | | 4/1994 | Dal Palú | |
| 5,429,397 A | * | 7/1995 | Kanao ..................... | 285/290.3 |
| 5,469,892 A | * | 11/1995 | Noone et al. ............... | 138/122 |
| 5,560,398 A | | 10/1996 | Pfleger | |
| 5,588,468 A | * | 12/1996 | Pfleger ........................ | 138/121 |
| 5,682,924 A | * | 11/1997 | Powell ....................... | 138/109 |
| 5,803,131 A | * | 9/1998 | Iwasa et al. ................ | 138/137 |
| 5,850,855 A | * | 12/1998 | Kerschbaumer et al. .... | 138/121 |
| 5,882,048 A | | 3/1999 | Kawasaki et al. | |
| 6,254,949 B1 | * | 7/2001 | Gluck et al. ................ | 138/121 |
| 6,318,410 B1 | * | 11/2001 | Miyajima et al. .......... | 138/109 |

FOREIGN PATENT DOCUMENTS

| EP | 0 470 605 A1 | 2/1992 |
|---|---|---|
| JP | 57-204386 A | 12/1982 |
| JP | 62-32284 | 2/1987 |
| JP | 62-47699 B2 | 10/1987 |
| JP | 3-75381 | 7/1991 |
| JP | 5-329956 A | 12/1993 |
| JP | 6-297492 A | 10/1994 |
| JP | 7-214690 A | 8/1995 |
| JP | 2875395 B2 | 1/1999 |
| JP | 11-280961 A | 10/1999 |

* cited by examiner

Primary Examiner—James Hook
(74) Attorney, Agent, or Firm—Frishauf, Holtz, Goodman & Chick, P.C.

(57) ABSTRACT

A corrugated resin tube which comprises, in at least one part of an axial direction of the tube, a corrugated portion having an undulated cross section along the axial direction, characterized in that the corrugated portion comprises at least one fiber-reinforced layer made of a thermoplastic resin or a thermoplastic elastomer, which contains inorganic fibers, and at least one resinous layer made of a thermoplastic resin or a thermoplastic elastomer, which contains no inorganic fibers or contains inorganic fibers in an amount less than the amount in the fiber-reinforced layer, wherein these layers are laminated and the outermost layer is the resinous layer. The content of the inorganic fibers in the fiber-reinforced layer is preferably from 5 to 20 wt %, and the thickness of the fiber-reinforced layer is from 30 to 70% of the whole thickness. This corrugated tube can be flexibly bent, has a vibration absorption property, and does not undergo elongation by heat or pressure, and therefore it is suitable for radiator hoses of automobiles.

3 Claims, 6 Drawing Sheets

CORRUGATED RESIN TUBE

This application is a U.S. National Phase Application under 35 USC 371 of International Application PCT/JP00/07633 (not published in English) filed Oct. 30, 2000.

TECHNICAL FIELD

The present invention relates to a corrugated resin tube suitable for, for example, radiator hoses of automobiles.

BACKGROUND

As radiator hoses of automobiles, rubber hoses have been generally used for such a reason that the rubber hoses can be flexibly bent into a shape fitted to the arrangement of an engine and a radiator and absorb the relative displacement of the engine and radiator due to vibration during driving automobiles.

However, the rubber hoses are heavy and hardly handled, and when these are connected to engines or radiators, it is required to fasten these with hose clamps, whereby there is a problem that operation efficiency for installation is poor.

On the other hand, plastic tubes made of a thermoplastic resin or the like have been known. Among them, one having a corrugated portion has been known wherein the cross section along its axial direction has an undulated and uneven configuration.

Such a plastic tube is advantageous in such a point that it is remarkably lighter than rubber hoses, whereby its handling properties are excellent, and that a resinous connector may be integrally molded at the end portion of the plastic tube by which the plastic tube can be attached to the pipe of the engine or radiator by one-touch operation. Therefore, the plastic tube is advantageous in view of its excellent operation efficiency for installation.

However, when the plastic tube having the corrugated portion is used as a radiator hose, there is a problem that the tube tends to elongate at the corrugated portion due to the temperature rise of a coolant and the increase of internal pressure. When the tube elongates, the absorption of displacement vibration as the function inherent to the corrugated portion is impaired, and the elongated tube may contact with other devices in an engine room and unwanted holes may be made, whereby no adequate reliability can be obtained.

In order to solve this problem, tubes having a structure such that the ridges of corrugated portion are partly collapsed or adjacent ridges of corrugated portion are partly connected, have been proposed. However, even by such a structure, it is impossible to effectively prevent the elongation of the tube when the tube was applied to radiator hoses or the like.

On the other hand, in JP-A-7-214690, a radiator hose comprising an inner layer, an adhesive layer and an outer layer, wherein the outer layer is partly made of a glass fiber-reinforced thermoplastic resin, is proposed. This radiator hose has a corrugated portion, the outer layer of this corrugated portion contains no glass fibers, and each of straight tube portions located at both sides of the corrugated portion has an outer layer made of a glass fiber-reinforced thermoplastic resin.

However, in the above radiator hose, since the corrugated portion is made of only a thermoplastic resin containing no glass fibers, when the temperature of a coolant and the internal pressure are raised, it is impossible to prevent the elongation of the tube at the corrugated portion. Further, since the outer layers of the straight tube portions are made of a thermoplastic resin containing glass fibers, there is a problem such that when a resinous connector or the like is integrally formed with the tube at the end portion of the tube, no adequate bonding force between the connector and the hose can be obtained.

DISCLOSURE OF THE INVENTION

Accordingly, it is an object of the present invention to provide a corrugated resin tube having a corrugated portion, by which bending operation is made possible, vibration absorption property can be imparted, and at the same time, elongation due to heat or pressure can be effectively prevented.

In order to accomplish the above object, the first aspect of the present invention provides a corrugated resin tube which comprises, in at least one part of an axial direction of the tube, a corrugated portion having an undulated cross section along the axial direction, characterized in that the corrugated portion comprises at least one fiber-reinforced layer made of a thermoplastic resin or a thermoplastic elastomer, which contains inorganic fibers, and at least one resinous layer made of a thermoplastic resin or a thermoplastic elastomer, which contains no inorganic fibers or contains inorganic fibers in an amount less than the amount in the fiber-reinforced layer, wherein these layers are laminated and at least the outermost layer is the resinous layer.

According to the above invention, by providing as an inner layer a fiber-reinforced layer made of a thermoplastic resin or a thermoplastic elastomer, which contains inorganic fibers, when it is applied to e.g. radiator hoses, the flexibility of the corrugated portion is not substantially impaired, whereby the elongation of the corrugated portion can be prevented even under the high temperature and high pressure conditions, and the exposure of patterns of fibers at the outermost surface of the outer layer due to the presence of reinforcing fibers can be prevented, whereby appearance, hand feeling and texture can be improved. Further, since both fiber-reinforced layer and resinous layer are mainly made of a thermoplastic resin or a thermoplastic elastomer, these can be produced by a method capable of mass production such as extrusion molding.

The second aspect of the present invention provides the corrugated resin tube according to the first aspect, wherein the fiber-reinforced layer constitutes an intermediate layer and the resinous layers constitute inner and outer layers.

According to the second aspect of the present invention, since the corrugated tube is comprised of three layers wherein the intermediate layer constituted by the fiber-reinforced layer is sandwiched between the inner and outer layers constituted by resinous layers, not only the outermost surface but also the innermost surface are made smooth, whereby the resistance by an internal fluid can be reduced.

The third aspect of the present invention provides the corrugated resin tube according to the first aspect, wherein the resinous layer constitutes an outer layer and the fiber-reinforced layer constitutes an inner layer.

According to the third aspect of the present invention, since the corrugated tube is comprised of two layers i.e. the outer and inner layers, there is an advantage that the production can be made easily.

The fourth aspect of the present invention provides the corrugated resin tube according to any one of the first to third aspects, wherein the content of the inorganic fibers in the fiber-reinforced layer is from 5 to 20 wt %.

According to the fourth aspect of the present invention, prevention of elongation of the corrugated portion and impartation of flexibility are both possible under high temperature and high pressure conditions, and at the same time, bending property is not impaired.

The fifth aspect of the present invention provides the corrugated resin tube according to any one of the first to fourth aspects, wherein the thickness of the fiber-reinforced layer is from 30 to 70% of the whole thickness.

According to the fifth aspect of the present invention, elongation of the corrugated portion under high temperature and high pressure conditions can effectively be prevented, and at the same time, the bending property and vibration absorption at the corrugated portion are not impaired.

The sixth aspect of the present invention provides a corrugated resin tube according to any one of the first to fifth aspects, wherein at at least one end portion of the corrugated resin tube, a resinous connector is integrally molded with the corrugated resin tube by providing a gate near the circumference of an outermost layer constituted by the resinous layer and injection molding a resin for the connector to form a corrugated resin tube having the resinous connector integrally molded.

According to the sixth aspect of the present invention, it is possible to connect the corrugated tube to the pipes of engines or radiators with the resinous connector with one-touch operation, and by integrally molding the resinous connector with the tube, air tightness can be secured. Further, in the corrugated resin tube of the present invention, since the outermost layer is constituted by a resinous layer, when the resinous connector is integrally molded, adhesion between the connector and tube is excellent.

Moreover, when a gate is provided near the circumference of the outermost layer made of the resinous layer and a resin for a connector is injection molded, the fiber-reinforced layer provided at the inside of the outermost layer constitutes a layer wherein the inorganic fibers which are not susceptible to thermal effect at the level of 300° C. are complicatedly entangled, whereby the shape can be kept without deformation, and it is possible to prevent the formation of a partial thin and weak portion in the tube wall.

The seventh aspect of the present invention provides the corrugated resin tube according to any one of the first to sixth aspects, wherein the corrugated resin tube is used for a radiator hose of an automobile.

According to the seventh aspect of the present invention, the radiator hose can be made light in weight and the operation efficiency for installation can be improved, and at the same time, even if the internal coolant becomes high in the temperature and pressure, it is possible to suppress the elongation and deformation of the hose.

In the present invention, as the inorganic fibers, glass fibers are preferably used. By using the glass fibers, the elongation of the corrugated portion under the high temperature and high pressure conditions can effectively be prevented, and at the same time, the material is inexpensive and therefore economical.

Further, as the thermoplastic resin used for the inner layer, an olefin type thermoplastic elastomer or thermoplastic resin is preferred. By using this material, flexibility can be imparted to the corrugated tube, and at the same time, solvent resistance to the coolant or the like containing e.g. ethylene glycol can be imparted.

BEST MODE FOR CARRYING OUT THE INVENTION

Figure 1:
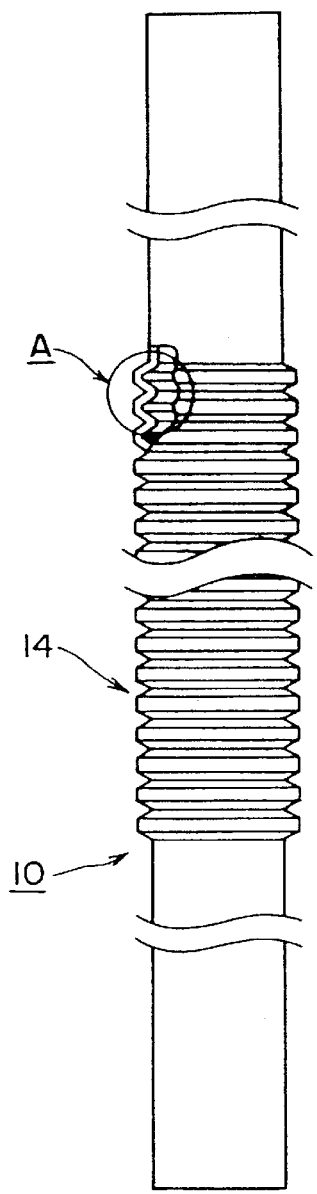
FIG. 1 is a partially cutaway side view showing an embodiment of a corrugated resin tube of the present invention.
Figure 2:
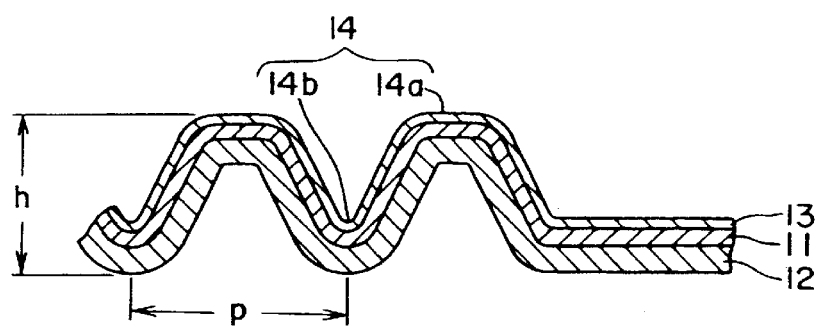
FIG. 2 is a partial cross sectional view showing an enlarged view of Part A in FIG. 1.

FIGS. 1 and 2 show an embodiment of the corrugated resin tube of the present invention. FIG. 1 is a partially cutaway side view showing a corrugated resin tube. FIG. 2 is a cross sectional view wherein Part A in FIG. 1 is enlarged.

This corrugated tube 10 is comprised of three layers i.e. an intermediate layer 11 made of a thermoplastic resin or a thermoplastic elastomer, containing inorganic fibers; an inner layer 12 which is bonded to the inner side of the intermediate layer 11 and made of a thermoplastic elastomer or a thermoplastic resin; and an outer layer 13 which is bonded to the outer side of the intermediate layer 11 and made of a thermoplastic elastomer or a thermoplastic resin. Here, at least one or both of the inner layer 12 and outer layer 13 may be constituted by laminating a plurality of layers. The intermediate layer 11 constitutes the fiber-reinforced layer in the present invention, and the inner layer 12 and outer layer 13 constitutes the resinous layers in the present invention.

As the inorganic fibers of the intermediate layer 11, glass fibers, carbon fibers and metal fibers may, for example, be mentioned. The glass fibers are preferably used from the economical viewpoint, or the like. As the inorganic fibers, continuous fibers may be used. However, from the viewpoint of e.g. moldability, it is preferred to use ones cut into a size at a level of from 1 to 50 mm. As a method for incorporating the inorganic fibers into the thermoplastic resin, various methods may be employed, for example, a method using pellets formed by mixing the inorganic fibers and a powdery thermoplastic resin, and heating and kneading the mixture with an extruder or the like; and a method using as a material a prepreg obtained by impregnating a preliminarily melted thermoplastic resin into bundles of inorganic fibers, and cutting them into a predetermined length.

As the thermoplastic resin for the intermediate layer 11, thermoplastic resins generally used for a fiber-reinforced thermoplastic resin (FRTP), for example, polypropylene, polyamide and polyethylene terephthalate, may be used.

Further, when the fiber-reinforced thermoplastic elastomer is used for the intermediate layer 11, various thermoplastic elastomers such as a styrene type, an olefin type, a vinyl chloride type, an amide type and an ester type, may be used. As a method for incorporating them, a method wherein a thermoplastic resin containing inorganic fibers and a thermoplastic elastomer containing no inorganic fibers are mixed, may preferably be employed.

Further, the content of the inorganic fibers in the intermediate layer 11 is preferably from 5 to 20 wt %, more preferably from 5 to 15 wt %. If the content of the inorganic fibers is less than 5 wt %, no adequate effect for preventing the elongation under high temperature and high pressure conditions, can be obtained. If it exceeds 20 wt %, the flexibility of the corrugated tube tends to be reduced, and therefore the bending property and vibration absorption will be reduced.

As the inner layer 12 and outer layer 12, a thermoplastic elastomer or a thermoplastic resin is used, as mentioned above. As the thermoplastic resin in this case, polypropylene, polyamide and polyethylene terephthalate may, for example, be used.

Further, as the thermoplastic elastomer, various thermoplastic elastomers, for example, a styrene type, an olefin type, a vinyl chloride type, an amide type and an ester type, may be used. Particularly, an olefin type thermoplastic elastomer comprising an olefin type resin as a hard segment and an olefin type rubber as a soft segment, is most preferred. As such a thermoplastic elastomer, "Asahi Kasei TPV" (trade name, manufactured by Asahi Chemical Industry Co., Ltd.), "Santoprene" (trade name, manufactured by AES Japan K.K.), "Sumitomo TPE" (trade name, manufactured by Sumitomo Chemical Co., Ltd.), "Milastomer" (trade name, manufactured by Mitsui Sekiyu Kagaku Kogyo K.K.) and "Oleflex" (trade name, manufactured by Nippon Polyolefin K.K.), may, for example, be mentioned.

As the inner layer 12, an olefin type thermoplastic elastomer may preferably be used in order to impart the flexibility to the corrugated tube and at the same time, impart the solvent resistance against, for example, a coolant containing e.g. ethylene glycol. Further, as the outer layer 13, an olefin type thermoplastic elastomer, polyamide or polypropylene, may preferably be employed. The inner layer 12 and outer layer 13 are not necessarily limited to a layer containing no inorganic fibers, and may contain the inorganic fibers so far as its content is lower than that of the intermediate layer 11.

The thickness of the intermediate layer 11 is preferably from 30 to 70% of the whole thickness. If the thickness of the intermediate layer 11 is less than 30% of the whole thickness, no adequate effect for preventing the elongation under high temperature and high pressure conditions is obtained, and if it exceeds 70%, the flexibility as the corrugated tube tends to be reduced, and therefore the bending property and vibration absorption will be reduced.

The thickness of the inner layer 12 and outer layer 13 is not particularly limited. However, relative to the whole thickness, the thickness of the inner layer 12 is preferably from 30 to 50%, and the thickness of the outer layer 13 is from 10 to 20%. It is preferred that the thickness of each layer is controlled appropriately by the diameter of the corrugated tube, the whole thickness or the like.

This corrugated tube 10 has, at an intermediate portion in its axial direction, a corrugated portion 14 having an undulated cross section along the axial direction. In this embodiment, the corrugated portion 14 has a configuration of a so-called bellows wherein in the appearance, an annularly extruding crest portion 14a and an annularly recessing trough portion 14b are alternately repeated with a predetermined distance. In this case, the pitch P of the crest portion 14a and trough portion 14b is preferably from 0.1 to 0.3 times of the outer diameter of the tube, and the height h of the crest portion 14a is preferably from 0.05 to 0.15 times of the outer diameter of the tube.

The crest portion 14a and trough portion 14b may be formed in a spiral shape, and may be formed at a part of the circumferential direction. Namely, the corrugated portion 14 may be the one of which the cross section along the axial direction has an undulated configuration at any portion in the axial direction, whereby bending property towards any direction is imparted. The one having a configuration of bellows as shown in FIG. 1 is most preferred, since it can be freely bent in any direction of the whole circumference.

Since the corrugated tube of the present invention is basically made of a thermoplastic elastomer or a thermoplastic resin, it can be produced by various methods such as extrusion molding or blow molding. However, from the viewpoint of productivity, extrusion molding is particularly preferably employed. Namely, a method may be used wherein resin materials for the inner layer 12, intermediate layer 11 and outer layer 13 are extruded at the same time from each of dies of an extruder having three slits, these are immediately bonded one another to form a tube having a three-layered structure, and this tube is pressed with a pair of molds which have an endless belt-like shape and is rotatably transferred, and the circumferential wall of the tube is pressed against the inner faces of the molds by the pressure from the inside and/or the suction from the outside to form a corrugated portion 14 at at least one part in the axial direction. Such a molding method is described in detail in, for example, Japanese Patent No. 2875395 and JP-B-62-47699.

The corrugated tube of the present invention can be utilized for, for example, radiator hoses for automobiles as well as air pipelines, filler tubes and the like. This corrugated tube is lighter than rubber tubes, and by the provision of the joint portion at the end portion, it can be installed easily. Further, by providing the corrugated portion at at least one part in the axial direction, it is possible to impart the bending property and vibration absorption like the rubber tubes. Further, since the corrugated tube is composed of plural layers and an intermediate layer comprising a thermoplastic resin or a thermoplastic elastomer, which contains inorganic fibers, even when it is used under high temperature and high pressure conditions as in the case of radiator hoses, it is possible to prevent the elongation of the corrugated portion and impart adequate durability.

Figure 7:
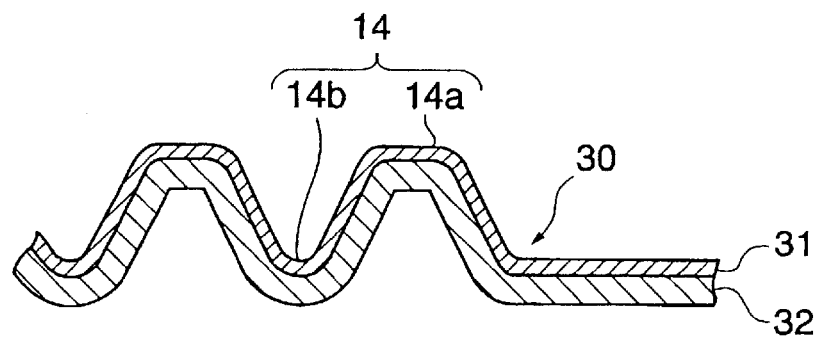
FIG. 7 is a partial cross sectional view showing another embodiment of the corrugated resin tube of the present invention.

FIG. 7 shows another embodiment of the corrugated resin tube of the present invention. This corrugated resin tube 30 is constituted by two layers of an outer layer made of a thermoplastic elastomer or a thermoplastic resin and an inner layer 32 made of a thermoplastic resin or a thermoplastic elastomer, which contains inorganic fibers. The rest of the structure is the same as the embodiments shown in FIGS. 1 and 2. In this embodiment also, since the inner layer 32 is made of a fiber-reinforced layer, it is possible to prevent the elongation of the corrugated portion under high temperature and high pressure conditions. Between the outer layer 31 and the inner layer 32, an adhesive layer may be provided so as to improve the adhesion of both layers. Further, the outer layer 31 is not limited to the layer containing no inorganic fibers, and may be a layer containing the inorganic fibers in an amount lower than that of the inner layer 32.

Figure 8:
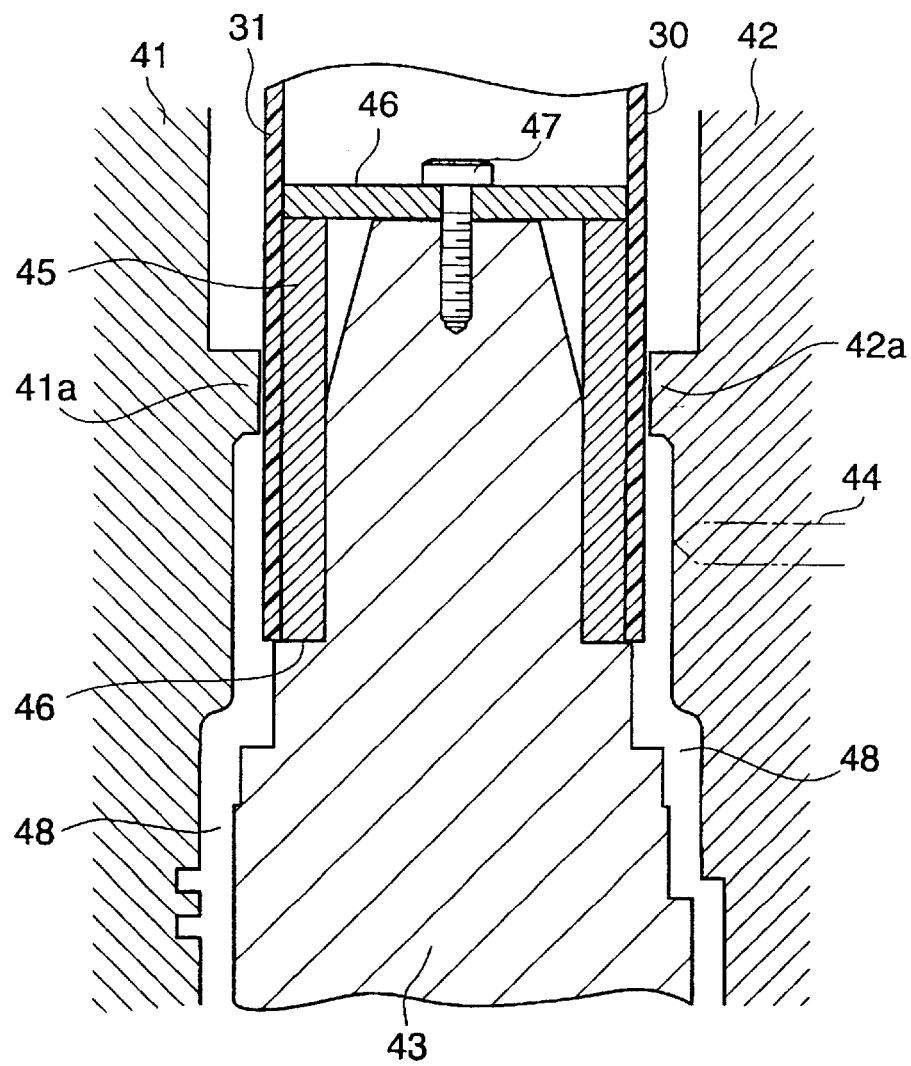
FIG. 8 is a partial cross sectional view of a mold when a resinous connector is integrally molded with the corrugated resin tube of the present invention.

FIG. 8 shows a cross section of a mold when a resinous connector is integrally molded in the production of the corrugated resin tube of the present invention.

This mold has a pair of die bodies 41, 42 and a core body 43. The die bodies 41, 42 can be opened and closed, and a cavity 48 is formed between the core body 43 and the corrugated resin tube 30. The numeral 44 in FIG. 8 is a gate for injecting a thermoplastic resin.

The core body 43 has a tapered cylindrical shape wherein the diameter is stepwise reduced. At the circumference of its front end portion, a movable ring 45 is loosely fitted, and at the upper end face of the movable ring 45, a fixing plate 46 is placed, in which the center of the fixing plate 46 is fixed to the core body 43 with a screw 47. The lower end face of the movable ring 45 is pressed against a step portion 46 of the core body 43 with the fixing plate 46.

The end portion of the corrugated resin tube 30 is inserted around the circumference of the movable ring 45, and introduced into the cavity 48 through diameter-reduced portions 41a, 42a of the die bodies 41, 42. The corrugated resin tube 30 is clamped with the movable ring 45 and the diameter-reduced portions 41a, 42a, to seal the cavity 48. At the upper corner portions of the diameter-reduced portions 41a, 42a, a tapered portion is formed so as to make the introduction operation of the corrugated resin tube 30 easy.

Under this state, when a resin material (a fiber-reinforced thermoplastic resin or the like) for forming a connector is injected from the gate, the resin material is filled in the cavity 48, and a connector is integrally molded at the circumference of the end portion of the corrugated resin tube 30.

Figure 9:
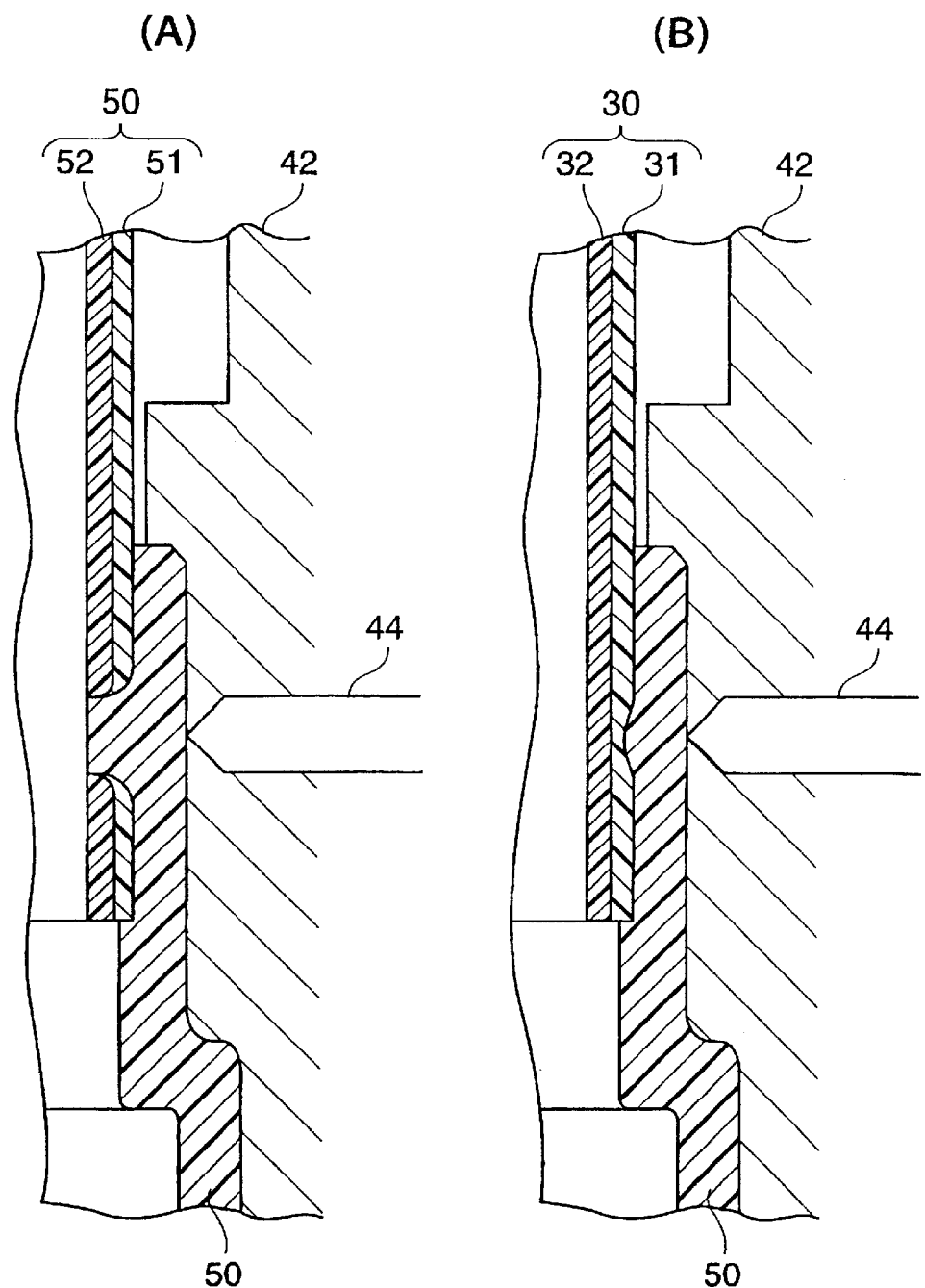
FIG. 9 is a partial cross sectional view showing the state in the vicinity of the gate when the resinous connector is integrally injection molded with the corrugated resin tube, wherein (A) is a state after injection when no fiber-reinforced layer is provided, and (B) is a state after injection when a fiber-reinforced layer is provided.

FIG. 9 is an enlarged view showing a state where the resin material is injected from the gate 44, and (A) shows a case using a corrugated tube 50 which comprises an outer layer 51 and an inner layer 52, wherein both layers are made of a thermoplastic resin containing no reinforcing fibers, and (B) shows a case using a corrugated tube 30 which comprises an outer layer 31 made of a thermoplastic resin containing no reinforcing fibers and an inner layer 32 made of a thermoplastic resin containing reinforcing fibers.

As illustrated in (A) of this figure, in the corrugated tube 50 having no fiber-reinforced layer, the resin injected from the gate 44 may sometimes substantially deform the wall of the corrugated tube 50, whereby the tube is locally weakened to a great extent. On the contrary, as illustrated in (B) of this figure, in the corrugated tube 30 in which the inner layer 32 is a fiber-reinforced layer, even if the resin is injected from the gate 44, the inner layer 32 will not become thin and its configuration will be kept. Further, since the strength of the corrugated tube mostly depends on the inner layer, even if the outer layer 31 becomes thin, it is possible to prevent the corrugated tube 30 from locally weakening.

Figure 10:
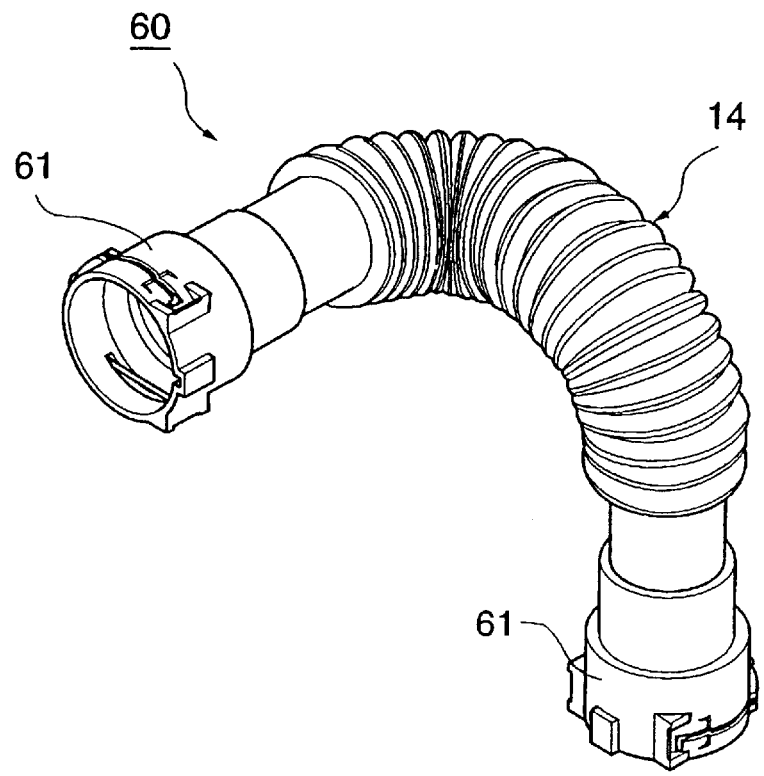
FIG. 10 is a perspective view showing a state when a resinous connector is provided in the corrugated resin tube of the present invention.

FIG. 10 shows a corrugated resin tube of the present invention in which a connector is integrally molded by the method as shown in FIG. 9. This corrugated resin tube 60 has a corrugated portion 14 at its intermediate section, and resinous connectors 61 are formed at both end portions by integral molding.

This corrugated tube 60 can be connected by one-touch operation only by fixing the resinous connector 61 to the pipe of an engine or a radiator, whereby the operation efficiency for installation can remarkably be improved.

EXAMPLE 1

A corrugated resin tube 10 with the structure in FIGS. 1 and 2, having a corrugated portion 14 at the intermediate portion, was prepared, provided that the inner layer 12, intermediate layer 11 and outer layer 13 were constituted as indicated in the following Table 1 and the tube had a diameter of 19 mm and a length of 250 mm. In the corrugated portion 14, the pitch P of the crest portions 14a and the trough portions 14b was 4.5 mm, the height h of the crest portion 14a was 2.0 mm, and the length of the corrugated portion 14 was 100 mm.

The intermediate layer 11 was obtained by blending, in the form of pellets, 100 parts by weight of glass fiber-reinforced Polyamide 6 (glass fiber content: 20 wt %, trade name: "Amilan CM1046-K4", manufactured by Toray Co.) and 100 parts by weight of Polyamide 6 (trade name: "Grilon R47WNZ", manufactured by EMS Japan K.K.) so that the glass fiber content would be 10 wt % as a whole.

COMPARATIVE EXAMPLE 1

A corrugated tube was prepared in the same manner as the preparation of the corrugated tube in Example 1 provided that the intermediate layer 11 was prepared by using only Polyamide 6 (trade name: "Grilon R47WNZ", manufactured by EMS Japan K.K.) without incorporating glass fibers, as indicated in Table 1.

TABLE 1

|  |  | Material | Thickness (mm) |
|---|---|---|---|
| Ex. 1 | Inner layer 12 | "Santoprene 191-85PA" (trade name, manufactured by AES Japan K.K.) | 0.5 mm |
|  | Intermediate Layer 11 | 100 parts by weight of glass fiber-reinforced Polyamide 6 (glass fiber content: 20 wt %, trade name: "Amilan CM1046-K4", manufactured by Toray Co.) and 100 parts by weight of Polyamide 6 (trade name: "Grilon R47WNZ", manufactured by EMS Japan K.K.); Glass fiber content as a whole: 10 wt % | 0.5 mm |
|  | Outer Layer 13 | Polyamide 6 (trade name: "Grilon R47WNZ", manufactured by EMS Japan K.K.) | 0.2 mm |
| Comp. Ex. 1 | Inner layer 12 | "Santoprene 191-85PA" (trade name, manufactured by AES Japan K.K.) | 0.5 mm |
|  | Intermediate Layer 11 | Polyamide 6 (trade name: "Grilon R47WNZ", manufactured by EMS Japan K.K.) | 0.5 mm |
|  | Outer Layer 13 | Polyamide 6 (trade name: "Grilon R47WNZ", manufactured by EMS Japan K.K.) | 0.2 mm |

TEST EXAMPLE 1

Figure 3:
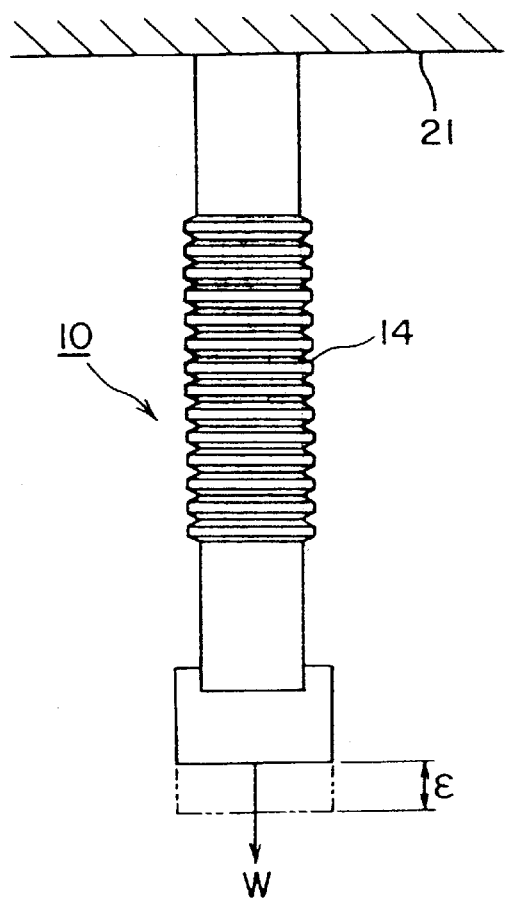
FIG. 3 is an explanatory view showing a method for the test of load in tension.

Using the corrugated tubes obtained in Example 1 and Comparative Example 2, as shown in FIG. 3, one end of the corrugated tube 10 was fixed to a supporting plate 21 held horizontally, and the corrugated tube was hanged vertically, and then another end of the corrugated tube was pulled down with a load of W=13 kg, and the change of elongation $\epsilon$ was measured (creep characteristics of the tube). The test was carried out at a temperature of 120° C.

Figure 5:
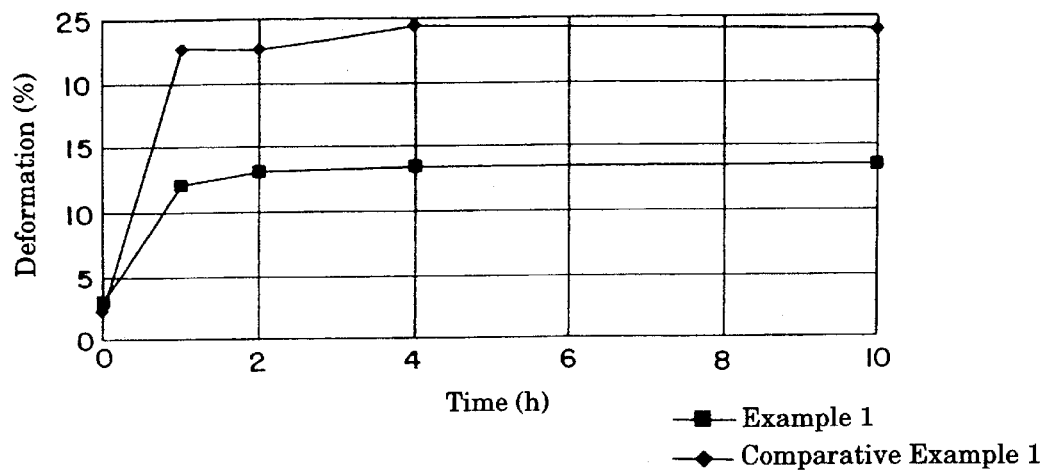
FIG. 5 is a graph showing results of the test of load in tension at 120° C. (test for creep characteristics of a tube).

The results of the measurement are indicated in FIG. 5. In FIG. 5, -■- represents the results of Example 1 and -♦- represents the results of Comparative Example 1.

As is evident from the results, the corrugated tube of the present invention containing the glass fibers in the intermediate layer 11 has a strong resistance against elongation even under the high temperature condition, and is sufficiently durable under the operational environment of radiator hoses or the like in automobiles.

TEST EXAMPLE 2

Figure 4:
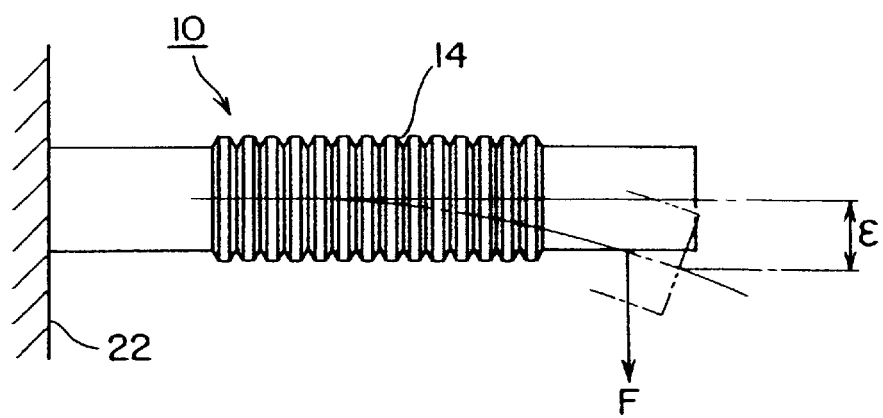
FIG. 4 is an explanatory view showing a method for the test of load in bending.

Using the corrugated tubes obtained in Example 1 and Comparative Example 2, as shown in FIG. 4, one end of the corrugated tube 10 was fixed to a supporting plate 22 held vertically, and cantilevered, and then another free end of the corrugated tube 10 was bent down with a load of F=40 g in a direction perpendicular to the axial direction of the tube 10, and the change of movement ε of the free end by the bending was measured (flexibility of the tube). The test was carried out at a temperature of 120° C.

Figure 6:
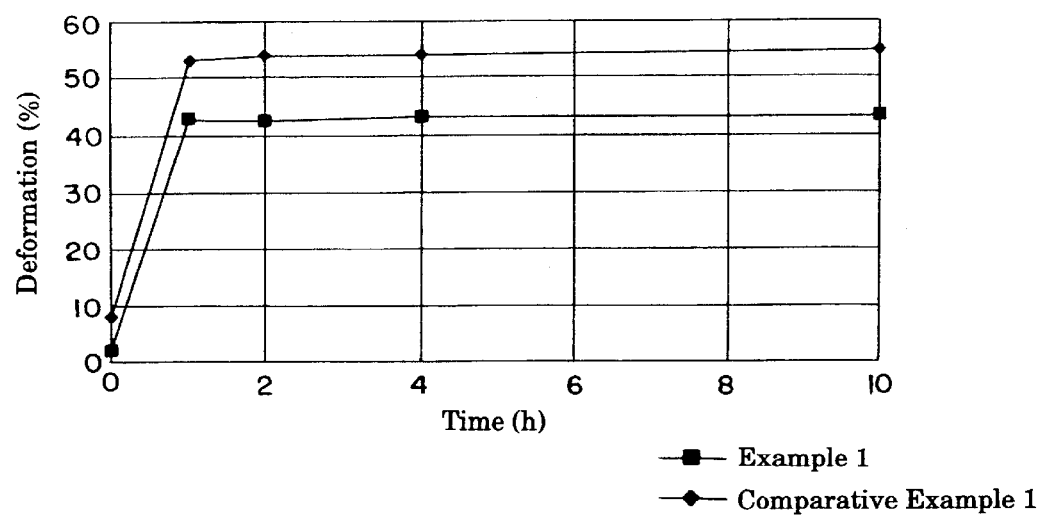
FIG. 6 is a graph showing results of load in bending at 120° C. (test for flexibility of a tube).

The results of the measurement are indicated in FIG. 6. In FIG. 6, -■- represents the results of Example 1 and -◆- represents the results of Comparative Example 1.

As is evident from the results, the corrugated tube of the present invention containing the glass fibers in the intermediate layer 11 has a bending property close to that of the tube of the Comparative Example, and although the glass fibers were incorporated, the flexibility is not impaired.

TEST EXAMPLE 3

At both ends of each of the corrugated tubes obtained in Example 1 and Comparative Example 1, resinous connectors were integrally molded in accordance with the method as shown in FIG. 9, to produce corrugated tubes as shown in FIG. 10. A coolant was filled into these corrugated tubes, and the coolant was heated and pressurized to 95° C. and 2 kg/cm$^2$, and the conditions after 48 hours were observed.

Figure 11:
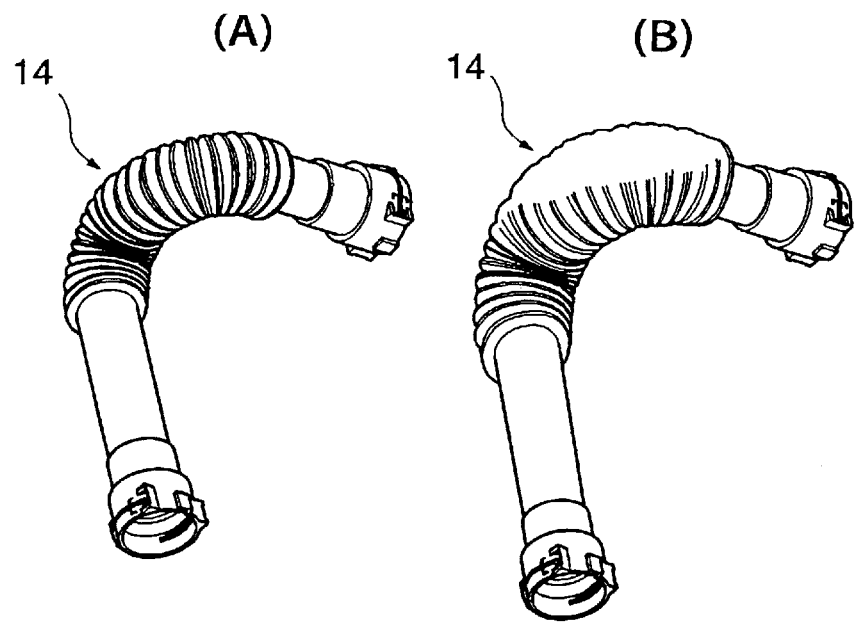
FIG. 11 is a perspective view showing a state after a coolant is passed through the corrugated resin tube and heating and pressurization are carried out, wherein (A) shows a corrugated resin tube having a fiber-reinforced layer of the present invention, and (B) shows a corrugated resin tube having no fiber-reinforced layer.

The results are shown in FIG. 11. The corrugated tube of Example 1 had no swell at the corrugated portion 14 and no substantial change in the length, as shown in (A) of this figure. On the contrary, in the corrugated tube of Comparative Example 1, the corrugated portion 14 was swelled and the length was substantially elongated, as shown in (B) of this figure.

EXAMPLE 2

A corrugated resin tube 10 having the structure of FIG. 7 was prepared, wherein the outer layer 31 and inner layer 32 were constituted as indicated in the following Table 2, provided that the diameter was 19 mm and the length was 250 mm, and the corrugated portion 14 was formed at the intermediate section of the tube. In the corrugated portion 14, the pitch P of the crest portions 14*a* and the trough portions 14*b* was 4.5 mm, the height h of the crest portion 14*a* was 2.0 mm, and the length of the corrugated portion 14 was 100 mm.

With respect to this corrugated tube, the same experiment as in TEST EXAMPLE 3 was carried out, and as a result, no swelling was observed at the corrugated portion and the entire length was substantially not changed, like (A) in the figure of TEST EXAMPLE 3.

TABLE 2

| | | Material | Thickness |
|---|---|---|---|
| Ex. 1 | Outer layer 31 | Polyamide 6 (trade name: "Grilon R47WNZ", manufactured by EMS Japan K.K.) | 0.5 mm |

TABLE 2-continued

| | Material | Thickness |
|---|---|---|
| Inner layer 32 | 100 parts by weight of glass fiber-reinforced polypropylene (glass fiber content: 20 wt %, trade name: "Novatec C-020X", manufactured by Nippon Polychem K.K.) and 100 parts by weight of a polyolefin type adhesive resin (trade name: "Modic AP-P513V", manufacture by Mitsubishi Chemical Co.) the glass fiber content as a whole: 10 wt % | 0.7 mm |

Applicability in Industrial Utilization

As mentioned above, the corrugated resin tube of the present invention is lighter than rubber tubes and can be installed in pipelines easily. Further, by providing a corrugated portion at at least one portion in the axial direction, It is possible to impart the bending property and vibration absorption like the rubber tubes. Furthermore, the corrugated portion comprises at least one fiber-reinforced layer made of a thermoplastic resin or a thermoplastic elastomer, which contains inorganic fibers, and at least one resinous layer made of a thermoplastic resin or a thermoplastic elastomer, which contains no inorganic fibers or contains inorganic fibers in an amount less than the amount in the fiber-reinforced layer, wherein these layers are laminated, and therefore the elongation of the corrugated portion can be prevented and an adequate durability can be obtained even when it is used under the high temperature and high pressure conditions, in, for example, radiator hoses. Moreover, since the corrugated tube is basically made of a thermoplastic resin or a thermoplastic elastomer, it can be produced by a method suitable for mass production such as extrusion molding. Accordingly, the corrugated resin tube of the present invention is preferably used for radiator hoses of automobiles or the like.

What is claimed is:

1. A corrugated resin tube which comprises, in at least one part of an axial direction of the tube, a corrugated portion having an undulated cross section along the axial direction, characterized in that the corrugated portion comprises at least one fiber-reinforced layer made of a thermoplastic resin or a thermoplastic elastomer, which contains inorganic fibers, and at least one resinous layer made of a thermoplastic resin or a thermoplastic elastomer, which contains no inorganic fibers or contains inorganic fibers in an amount less than the amount in the fiber-reinforced layer, wherein these layers are laminated and at least the outermost layer is the resinous layer;

wherein the content of the inorganic fibers in the fiber-reinforced layer is from 5 to 20 wt %, and the thickness of the fiber-reinforced layer is from 30 to 70% of the whole thickness and wherein the fiber-reinforced layer constitutes an intermediate layer and the resinous layers constitute inner and outer layers and the inner layer consists essentially of an olefin type thermoplastic elastomer.

2. The corrugated resin tube according to claim 1, wherein at at least one end portion of the corrugated resin tube, a resinous connector is integrally molded with the corrugated resin tube by providing a gate near the circumference of an outermost layer constituted by the resinous layer and injection molding a resin for the connector to form a corrugated resin tube having the resinous connector integrally molded and wherein the corrugated resin tube has the fiber-reinforced layer at at least one end portion; and the resinous connector is integrally molded at said end portion.

3. The corrugated resin tube according to claim 1, wherein the corrugated resin tube is an automobile radiator hose.

* * * * *